United States Patent
Hsu

(10) Patent No.: US 8,636,423 B2
(45) Date of Patent: Jan. 28, 2014

(54) OPTICAL FIBER CONNECTOR WITH POSITIONING MEMBERS

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/278,117

(22) Filed: Oct. 20, 2011

(65) Prior Publication Data

US 2013/0071069 A1    Mar. 21, 2013

(30) Foreign Application Priority Data

Sep. 15, 2011   (TW) .............................. 100133205 A

(51) Int. Cl.
   *G02B 6/36* (2006.01)
(52) U.S. Cl.
   USPC .......................................................... 385/77
(58) Field of Classification Search
   USPC ................... 385/53–94; 439/439, 821
   See application file for complete search history.

(56) References Cited

U.S. PATENT DOCUMENTS

| | | | | |
|---|---|---|---|---|
| 4,047,796 A * | 9/1977 | Kao et al. | ......................... | 385/70 |
| 4,183,619 A * | 1/1980 | Makuch | ......................... | 385/82 |
| 4,192,575 A * | 3/1980 | Hodge | ......................... | 385/70 |
| 4,201,444 A * | 5/1980 | McCartney et al. | ............ | 385/64 |
| 4,232,934 A * | 11/1980 | Feinbloom | ..................... | 385/88 |
| 4,397,522 A * | 8/1983 | Parr | ................................ | 385/62 |
| 4,413,880 A * | 11/1983 | Forrest et al. | ................... | 385/87 |
| 4,614,401 A * | 9/1986 | Strait, Jr. | ......................... | 385/64 |
| 4,684,212 A * | 8/1987 | van der Vegte et al. | ......... | 385/64 |
| 5,363,461 A * | 11/1994 | Bergmann | ...................... | 385/78 |
| 5,377,289 A * | 12/1994 | Johnson et al. | ................... | 385/65 |
| 5,404,417 A * | 4/1995 | Johnson et al. | ................. | 385/137 |
| 5,602,951 A * | 2/1997 | Shiota et al. | ..................... | 385/81 |
| 6,302,595 B1 * | 10/2001 | Vilgiate et al. | .................. | 385/88 |
| 6,483,961 B1 * | 11/2002 | Helkey et al. | .................... | 385/18 |
| 2002/0037142 A1 * | 3/2002 | Rossi | .............................. | 385/92 |
| 2002/0164129 A1 * | 11/2002 | Jackson | ........................... | 385/52 |
| 2003/0202769 A1 * | 10/2003 | Gutierrez et al. | ............. | 385/137 |
| 2005/0123248 A1 * | 6/2005 | Sakurai et al. | ................... | 385/78 |

* cited by examiner

*Primary Examiner* — Mark Robinson
*Assistant Examiner* — Zachary A Nemtzow
(74) *Attorney, Agent, or Firm* — Altis Law Group, Inc.

(57) ABSTRACT

An optical fiber connector includes optical fibers, a connector body, and positioning members. The optical fibers are received in the respective through holes, and pass through the respective first recesses, the respective separating portions, and the respective second recesses, and aligned with the optical lenses. The three engagement posts of the positioning member are arranged above a through hole and surround a receiving room. The three engagement posts and a separating portion cooperatively retain an optical fiber in the connector body.

1 Claim, 7 Drawing Sheets

OPTICAL FIBER CONNECTOR WITH POSITIONING MEMBERS

BACKGROUND

1. Technical Field

The present disclosure relates to optics and, particularly, to an optical fiber connector.

2. Description of Related Art

An optical fiber connector is preferred for use in data transmission between electronic devices due to its high transmission speed and signal integrity. The optical fiber connector includes a connector body, optical fibers, blind holes defined in the connector body for receiving the optical fibers, a cover assembled in the connector body to fix the optical fibers, and optical lenses aligned with the respective optical fibers.

When the optical fiber connector is assembled, the optical fibers are inserted into the respective blind holes, the cover is assembled into the connector body to contact the optical fibers, glue is dropped around the cover to fix the cover in the connector body while the cover is subjected to pressure. However, the cover is easily moved, disturbing the mass of optical fibers. This vulnerability may decrease transmission efficiency and degrade signal integrity.

Therefore, it is desirable to provide an optical fiber connector, which can overcome or at least alleviate the limitations described.

DETAILED DESCRIPTION

Figure 1:
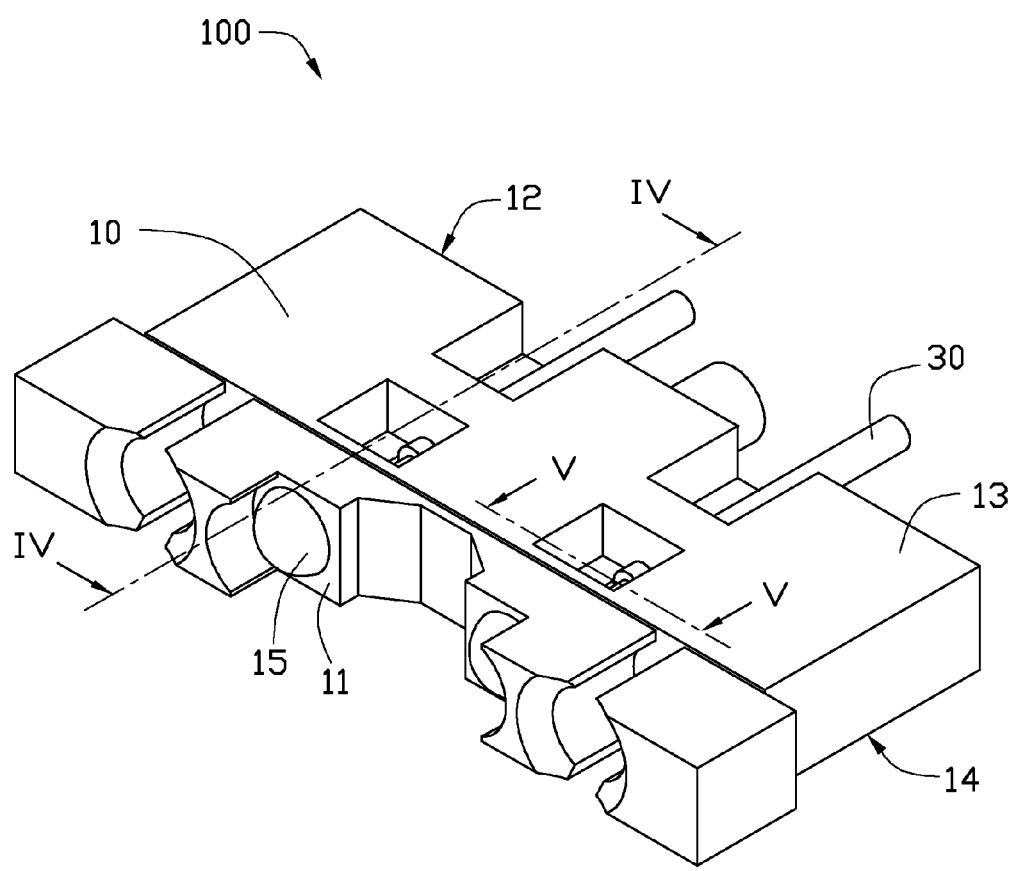
FIG. 1 is an isometric view of an optical fiber connector including a connector body, according to a first exemplary embodiment.
Figure 2:
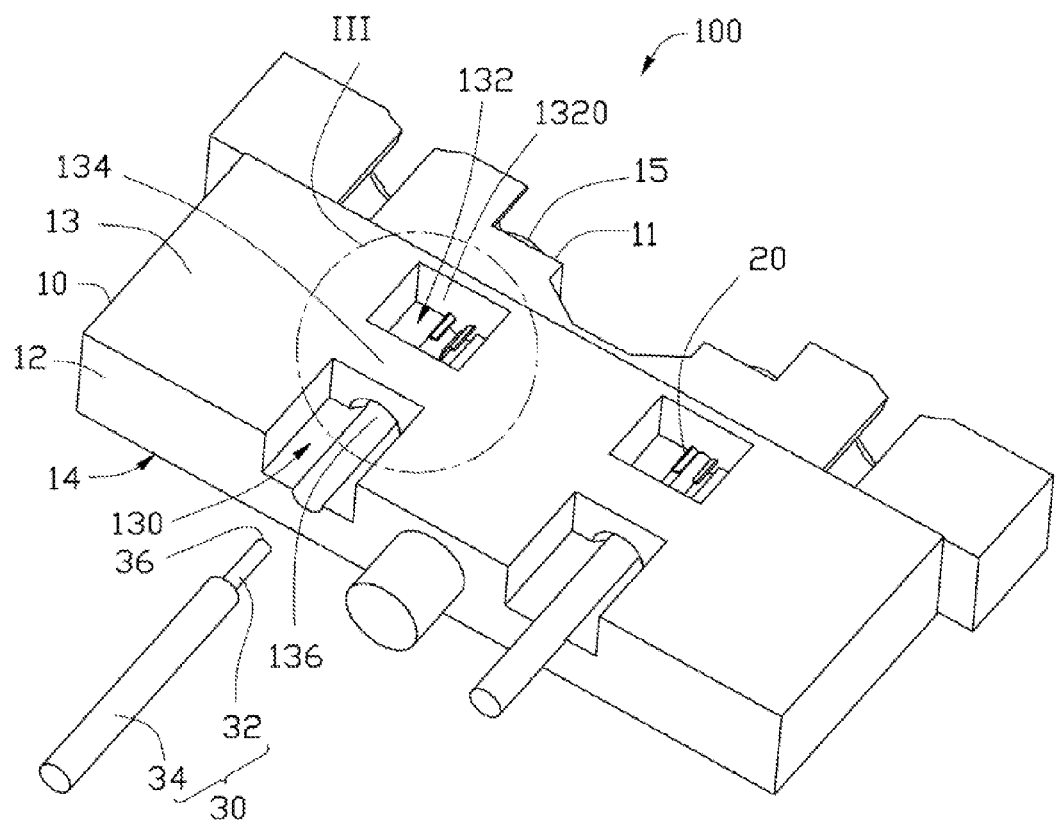
FIG. 2 is an exploded view of the optical fiber connector of FIG. 1.

Referring to FIGS. 1-2, an optical fiber connector 100, according to a first exemplary embodiment, includes a connector body 10, two positioning members 20, and two optical fibers 30.

Figure 3:
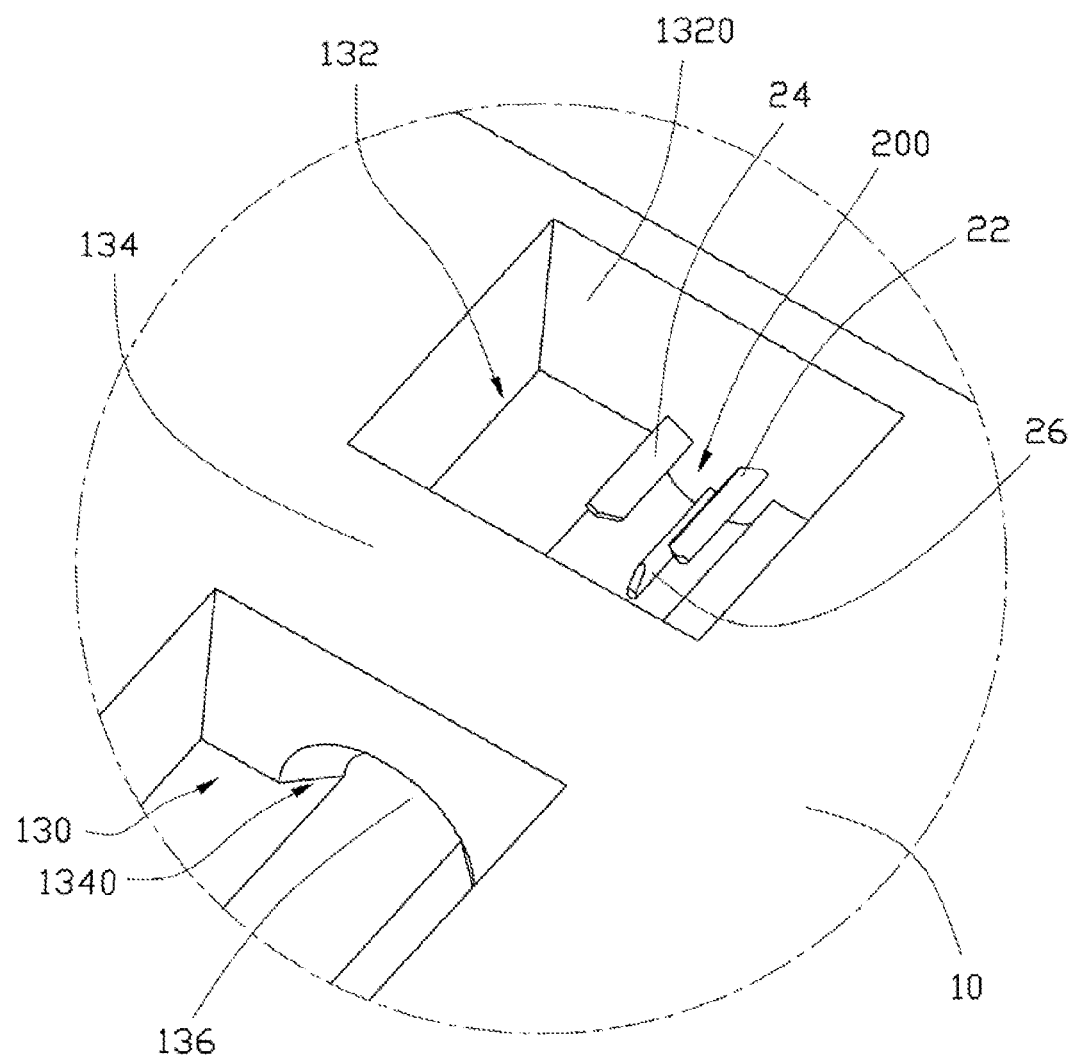
FIG. 3 is an enlarged view of section III of FIG. 2.

Referring to FIGS. 1-3, the connector body 10 is substantially cuboid. The connector body 10 includes a first side surface 11, a second side surface 12, an upper surface 13, a lower surface 14, and two optical lenses 15. The first side surface 11 is substantially parallel to the second side surface 12. The upper surface 13 is substantially parallel to the lower surface 14. The upper surface 13 is perpendicularly interconnected between the first side surface 11 and the second side surface 12. The lower surface 14 is perpendicularly interconnected between the first side surface 11 and the second side surface 12. The optical lenses 15 are formed on the first side surface 11 and. are apart from each other.

The upper surface 13 includes two first recesses 130, two second recesses 132, two separating portions 134, and two through holes 136. Each first recess 130 corresponds to a separating portion 134, a second recess 132, a through hole 136, and one of the optical lenses 15. The first recess 130 is exposed at the second side surface 12. The second recess 132 is arranged between the first recess 130 and the optical lens 15. The separating portion 134 is arranged between the first recess 130 and the second recess 132 and separates the first recess 130 from the second recess 132. That is, the first recess 130, the separating portion 134, and the second recess 132 are arranged in order from the second side surface 12 to the first side surface 11. The two through holes 136 are substantially parallel to each other and align with the two optical lenses 15, respectively. Each through hole 136 starts from the second side surface 12, and then passes through the first recess 130 and the separating portion 134, and finally terminates at the second recess 132.

The second recess 132 includes an inner side surface 1320. The inner side surface 1320 is perpendicular to a line along a lengthwise direction of the through hole 136 and is opposite to the separating portion 134. The inner side surface 1320 coincides with the focal plane of the optical lens 15. A lead angle portion 1340 is defined in a side of each of the separating portions 134 adjacent to the first recess 130. The lead angle portion 1340 communicates with the through hole 136 and surrounds the through hole 136.

The two positioning members 20 are arranged in the two second recesses 132, respectively. Each positioning member 20 corresponds to a through hole 136 along a direction perpendicular to the upper surface 13, and each positioning member 20 corresponds to an optical lens 15 along a direction perpendicular to the first side surface 11 and the second side surface 12. Each positioning member 20 includes a first engagement post 22, a second engagement post 24, and a third engagement post 26. The three engagement posts 22, 24, and 26 surround a circular receiving room 200. In this embodiment, the three engagement posts 22, 24, and 26 perpendicularly extend from the inner side surface 1320 toward the second side surface 12. The center of the receiving room 200 coincides with the center of the corresponding optical lens 15. The three engagement posts 22, 24, and 26 are evenly distributed around the center of the receiving room 200. In detail, a Cartesian coordinate system is set up. In the Cartesian coordinate system, the center of the receiving room 200 is the origin, a line passing through the origin and perpendicular to the upper surface 13 in the inner side surface 1320 is the X axis, and a line passing through the origin and perpendicular to the X axis in the inner side surface 1320 is the Y axis In this Cartesian coordinate system, the three engagement posts 22, 24, and 26 are located at angles of 30, 120, and 270 degrees, respectively. The two positioning members 20 and the connector body 10 are formed into a unitary piece.

Figure 6:
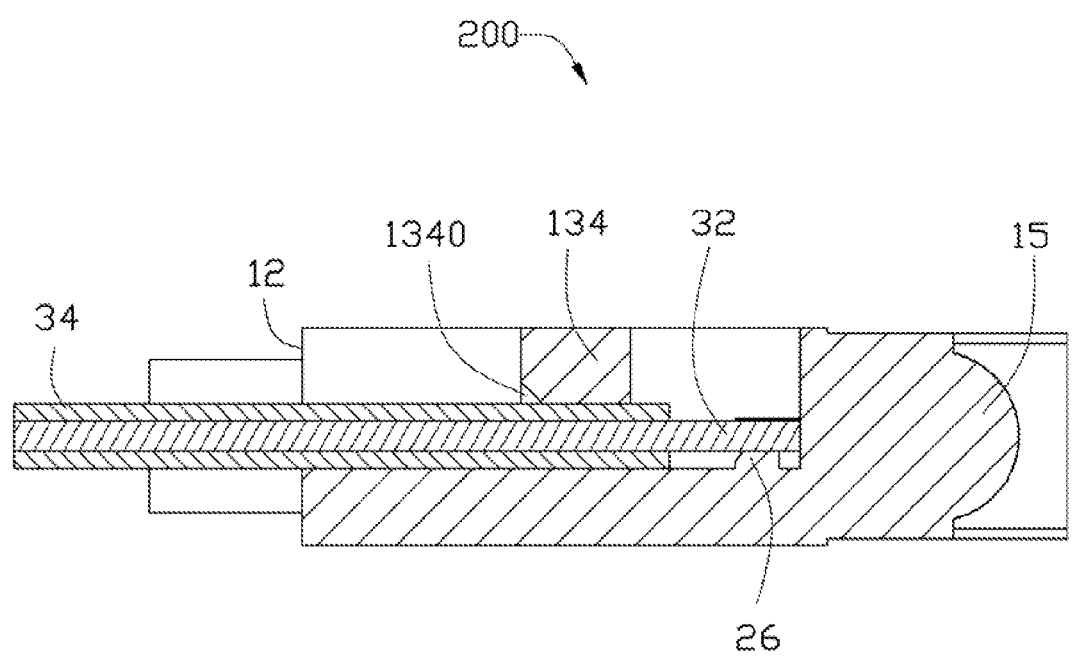
FIG. 6 is similar to FIG. 4, but showing an optical fiber Connector of a second exemplary embodiment.
Figure 7:
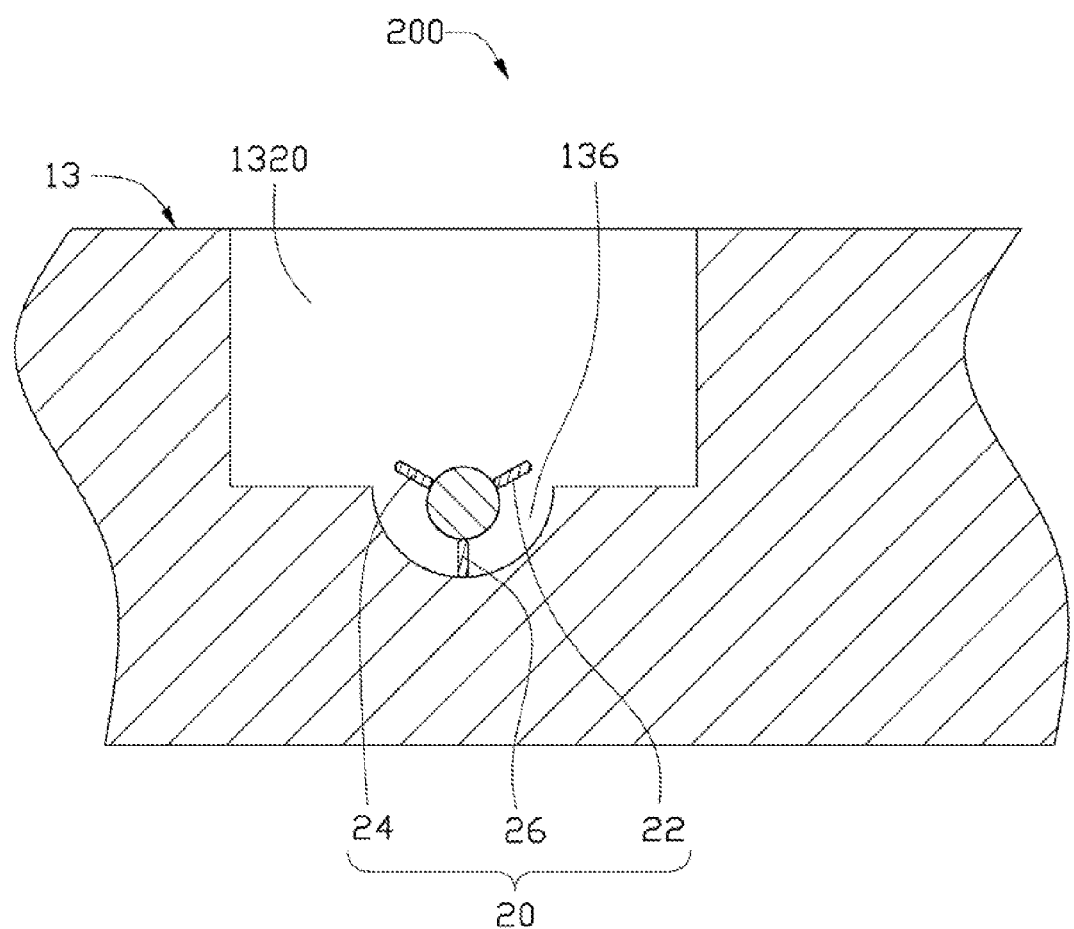
FIG. 7 is similar to FIG. 5, but showing the optical fiber connector of the second exemplary embodiment.

Referring to FIGS. 6-7, in an optical fiber connector 200 according to a second exemplary embodiment, the three engagement posts 22, 24, and 26 do not all perpendicularly extend from the inner side surface 1320 toward the second side surface 12. Instead, the first engagement post 22 and the second engagement post 24 perpendicularly extend from the inner side surface 1320 toward the second side surface 12, and the third engagement post 26 perpendicularly extends from the bottom of the corresponding through hole 136 toward the upper surface 13. The two positioning members 20 and the connector body 10 may not be formed into a unitary piece.

Each of the optical fibers 30 is received in the corresponding through hole 136, and passes through the corresponding first recess 130, the corresponding separating portion 134, and the corresponding second recess 132, and is aligned with corresponding optical lens 15. Each optical fiber 30 includes a main portion 34 which is substantially circular in section, and a concentric front portion 32. The main portion 34 consists of a core portion and a cladding portion surrounding the core portion. The front portion 32 consists of the core portion exposed, and the front portion 32 has a certain critical length. The main portion 34 extends through the through hole 136 of the separating portion 134 and is held by the separating portion 134. The front portion 32 is received in the receiving room 200, and the three engagement posts 22, 24, and 26 cooperatively retain the front portion 32, and thereby the optical fibers 30 are fixed in the connector body 10. In this embodiment, the end surface 36 of each of the optical fibers 30 abuts against the inner side surface 1320.

Figure 4:
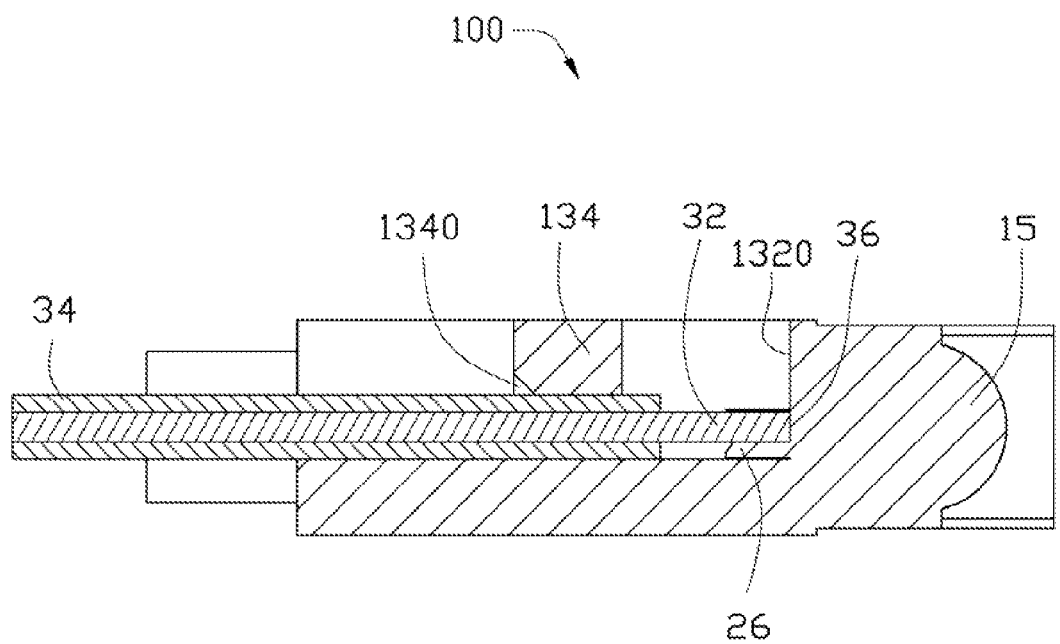
FIG. 4 is an enlarged sectional view of the optical fiber connector taken along line IV-IV of FIG. 1.
Figure 5:
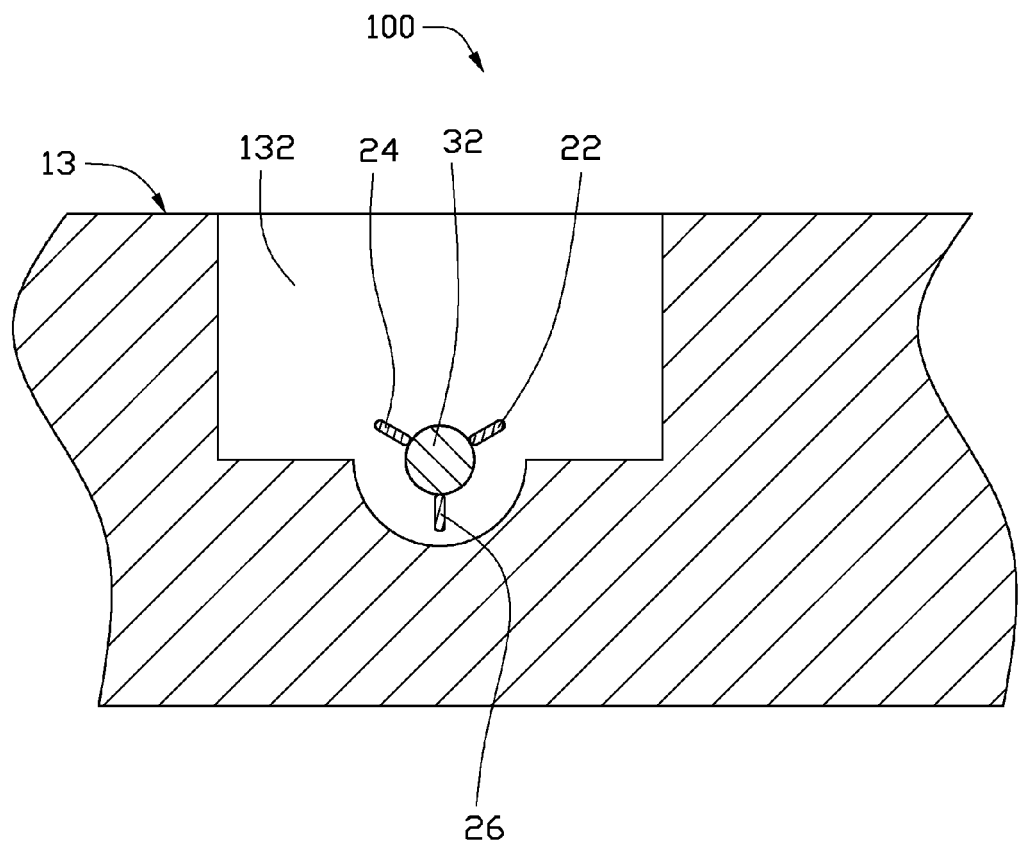
FIG. 5 is an enlarged sectional view of the optical fiber connector taken along line V-V of FIG. 1.

Referring to FIGS. 3-5, when the optical fibers 30 are inserted into the connector body 10, the optical fibers 30 are received in the respective through holes 136. In particular, the main portion 34 extends through the through hole 136 of the separating portion 134 and is held by the separating portion 134. The from portion 32 is received in the receiving room 200, and the three engagement posts 22, 24, and 26 cooperatively retain the front portion 32, and thereby the optical fibers 30 are fixed in the connector body 10 and cannot move. This reduces incidental light loss, increases transmission efficiency and enhances signal integrity.

In addition, the end Surface 36 of the optical fiber 30 abuts against the inner side surface 1320, so as to ensure a precise spatial coincidence between the end surface 36 and the local plane of the optical lens 15, is and thereby provide an assurance of data transmission accuracy. Furthermore, the lead angle 1340 protects each of the optical fibers 30 from damage when the optical fiber 30 is inserted into the separating portion 134.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An optical fiber connector, comprising:
a plurality of optical fibers;
a connector body comprising a first side surface, a second side surface parallel to the first side surface, an upper surface perpendicularly interconnected between the first side surface and the second side surface, and a plurality of optical lenses arranged at the first side surface, the connector body including a plurality of first recesses defined in the upper surface and exposed at the second side surface, a plurality of second recesses defined in the upper surface and arranged between the first recesses and the optical lenses, a plurality of separating portions separating the first recesses from the second recesses, and a plurality of through holes passing through the second side surface, the first recesses, the separating portions, and the second recesses, each of the second recesses comprising an inner side surface, the inner side surface being perpendicular to a line along a lengthwise direction of the corresponding through hole and being opposite to the separating portion, the optical fibers received in the respective through holes, and passing through the respective first recesses, the respective separating portions, and the respective second recesses, and aligned with the respective optical lenses; and
a plurality of positioning members received in the second recesses respectively, each positioning member comprising a first engagement post, a second engagement post, and a third engagement post, the three engagement posts corresponding to one of the through holes and surrounding a receiving room, the three engagement posts perpendicularly extending from the inner side surface toward the second side surface, the three engagement posts and the corresponding separating portion cooperatively retaining the corresponding optical fiber in the connector body;
wherein the center of the receiving room coincides with the center of the corresponding optical lens, the three engagement posts are evenly distributed around the center of the receiving room, each optical fiber comprises a main portion consisting of a core portion and a cladding portion surrounding the core portion, and a front portion consisting of an exposed core portion proximate to the main portion, the main portion passes through the through hole of the separating portion and is held by the separating portion, the front portion is received in the receiving room, and the three engagement posts cooperatively retain the front portion, a lead angle portion is formed in a side of each of the separating portions adjacent to the first recess, the lead angle portion communicates with the through hole and surrounds the through hole, the end surface of the optical fiber abuts against the inner side surface, and the inner side surface coincides with the focal plane of the optical lens.

* * * * *